United States Patent [19]

Baker et al.

[11] Patent Number: 5,278,880
[45] Date of Patent: Jan. 11, 1994

[54] PRESSURIZER TANK UPPER SUPPORT

[75] Inventors: Tod H. Baker, O'Hara Township, Allegheny County; Howard L. Ott, Kiski Township, Armstrong County, both of Pa.

[73] Assignee: Westinghouse Electric Corp., Pittsburgh, Pa.

[21] Appl. No.: 903,834

[22] Filed: Jun. 24, 1992

[51] Int. Cl.$^5$ .............................................. G21C 13/04
[52] U.S. Cl. .................................. 376/285; 376/307; 376/461
[58] Field of Search .................. 376/461, 285, 307; 248/154; 122/510

[56] References Cited

U.S. PATENT DOCUMENTS

| | | |
|---|---|---|
| 3,716,451 | 2/1973 | Van Sickel et al. ............... 376/461 |
| 4,426,350 | 1/1984 | Zegar et al. ...................... 376/307 |
| 4,576,788 | 3/1986 | Blaushild ........................ 376/461 |
| 4,629,601 | 12/1986 | Blaushild ........................ 376/461 |

*Primary Examiner*—Daniel D. Wasil
*Attorney, Agent, or Firm*—J. C. Valentine

[57] ABSTRACT

A pressurizer tank in a pressurized water nuclear reactor is mounted between structural walls of the reactor on a substructure of the reactor, the tank extending upwardly from the substructure. For bearing lateral loads such as seismic shocks, a girder substantially encircles the pressurizer tank at a space above the substructure and is coupled to the structural walls via opposed sway struts. Each sway strut is attached at one end to the girder and at an opposite end to one of the structural walls, and the sway struts are oriented substantially horizontally in pairs aligned substantially along tangents to the wall of the circular tank. Preferably, eight sway struts attach to the girder at 90° intervals. A compartment encloses the pressurizer tank and forms the structural wall. The sway struts attach to corners of the compartment for maximum stiffness and load bearing capacity. A valve support frame carrying the relief/discharge piping and valves of an automatic depressurization arrangement is fixed to the girder, whereby lateral loads on the relief/discharge piping are coupled directly to the compartment rather than through any portion of the pressurizer tank. Thermal insulation for the valve support frame prevents thermal loading of the piping and valves. The girder is shimmed to define a gap for reducing thermal transfer, and the girder is free to move vertically relative to the compartment walls, for accommodating dimensional variation of the pressurizer tank with changes in temperature and pressure.

14 Claims, 5 Drawing Sheets

5,278,880

1

PRESSURIZER TANK UPPER SUPPORT

GOVERNMENT CONTRACT

The Government of the United States of America has rights in this invention pursuant to Contract No. DE-AC03-90F18495 awarded by the Department of Energy.

BACKGROUND OF THE INVENTION

1. Field of the Invention

This invention relates to a support for the pressurizer tank of a pressurized water nuclear reactor or the like, which maintains the tank relative to its housing against seismic shocks and other dynamic loads, while permitting certain variations in dimensions resulting from temperature and pressure variations in the reactor coolant system.

2. Prior Art

In a pressurized water nuclear reactor, the reactor vessel containing nuclear fuel is coupled in a circulating coolant loop with a steam generator for extracting power from the coolant. A pressurizer tank is coupled to the coolant outlet of the reactor vessel, also known as the hot leg of the primary coolant circuit, for maintaining the required pressure in the reactor coolant system. Under operational conditions, the coolant in the hot leg may be at about 600° F. (315° C.) and 2,250 psi (150 bar).

The reactor vessel, one or more steam generators and the pressurizer tank typically are disposed in a containment building. The pressurizer tank is a vertically elongated, normally cylindrical tank located at a higher elevation than the reactor vessel. The bottom head of the pressurizer tank is coupled to the hot leg via a conduit, and top head of the pressurizer tank is coupled to the reactor inlet or cold leg through a check valve.

The pressurizer tank may be associated with a passive cooling system, for example as shown in U.S. Pat. No. 4,753,771 - Conway et al. The pressurizer is further coupled by depressurizer valves to spargers in a refueling water storage tank. By opening the depressurizer valves the reactor coolant circuit is brought down to atmospheric pressure in the containment building so that water from the refueling water storage tank can be added by gravity feed, without the need for pumps capable of high output pressure. The depressurizer valves and the conduits associated with them are coupled to the pressurizer at the top. If the depressurizing system is staged (i.e., having a plurality of separate valved conduits opening at successively lower pressures), additional weight is placed on the pressurizer supporting structures.

The pressurizer tank can be placed on a foundation structure and housed in a compartment extending along the sides of the tank. Inasmuch as the pressurizer tank is vertically elongated, it is useful to support the tank against lateral forces at a point above the foundation structure, such as forces which may occur during a seismic shock. The conventional pressurizer upper support, shown in FIG. 3, comprises four individual struts attached at one end to the walls of the pressurizer compartment and extending radially inwardly. The inner end of the struts have vertical slots which engage over radially protruding lugs on the outer walls of the pressurizer tank. This conventional mounting has a low overall stiffness, which contributes to seismic loading, and a limited load capacity. Seismic loading problems are compounded if the pressurizer compartment also has a low stiffness, as characteristic of modular building structures. Moreover, mounting a number of valves and conduits at the top of the pressurizer tank for staged depressurization increases the expected loading due to the size, elevation and weight of the discharge piping and valves.

It would be possible with a static tank to simply increase the size and weight of the structures supporting the tank, thereby holding the tank more intimately and securely. However, a pressurizer tank is not static. There are extreme variations in coolant system pressure and temperature between the operational and shutdown states of the reactor. The pressurizer tank can be expected to vary in dimensions due to both thermal expansion and hydraulic pressure. There is a need to provide an improved supporting structure for the pressurizer tank, which can adequately support the tank as well as the discharge piping and valves coupled high on the tank, transferring loads to the compartment walls in a favorable fashion while providing high stiffness and loading capacity.

SUMMARY OF THE INVENTION

It is an object of the invention to provide improved lateral support of a vertically elongated pressurizer tank, to protect against seismic loads.

It is another object of the invention to provide a mounting point for relief/discharge valves and piping associated with the pressurizer tank, without causing lateral loads resulting from such items to be borne by the pressurizer tank.

It is a further object to provide a durable high load capacity lateral restraint for a pressurizer tank, which accommodates the dimensional variations and temperature variations occurring during startup and cooldown of the reactor.

These and other objects are accomplished for a pressurizer tank in a pressurized water nuclear reactor, mounted between structural walls of the containment interior, such as interior concrete walls, and rests on a substructure of the containment, the tank having a vertically elongated tank wall extending upwardly from the substructure. For bearing lateral loads such as seismic shocks, a girder substantial encircles the pressurizer tank at a space above the substructure and is coupled to the structural walls via opposed sway struts. Each sway strut is attached at one end to the girder and at an opposite end to one of the structural walls, and the sway struts are oriented substantially horizontally in pairs aligned substantially along tangents to the circular tank wall. Preferably, eight sway struts attach to the girder at 90° intervals. A compartment encloses the pressurizer tank and forms the structural wall. The sway struts attach to corners of the compartment for maximum stiffness and load bearing capacity. A valve support structural frame carrying the relief/discharge piping of an automatic depressurization arrangement is fixed to the girder, whereby lateral loads on the relief/discharge piping are coupled directly to the compartment rather than through any portion of the pressurizer tank. The structural frame can be welded to the girder, and the girder can be pinned vertically relative to the pressurizer tank by interfitting plates on the girder and tank, fixed by horizontal pins. Thermal insulation for a lower portion of the valve support frame minimizes thermal loading of the piping. Strip shims are placed between the pressurizer tank outside surface and the support girder inside diameter to provide a lateral load path while minimizing heat transfer to the girder. The girder is free to move vertically relative to the pressurizer tank compartment walls, for accommodating dimensional variation of the pressurizer tank with changes in temperature and pressure.

DETAILED DESCRIPTION OF THE PREFERRED EMBODIMENTS

Figure 1:
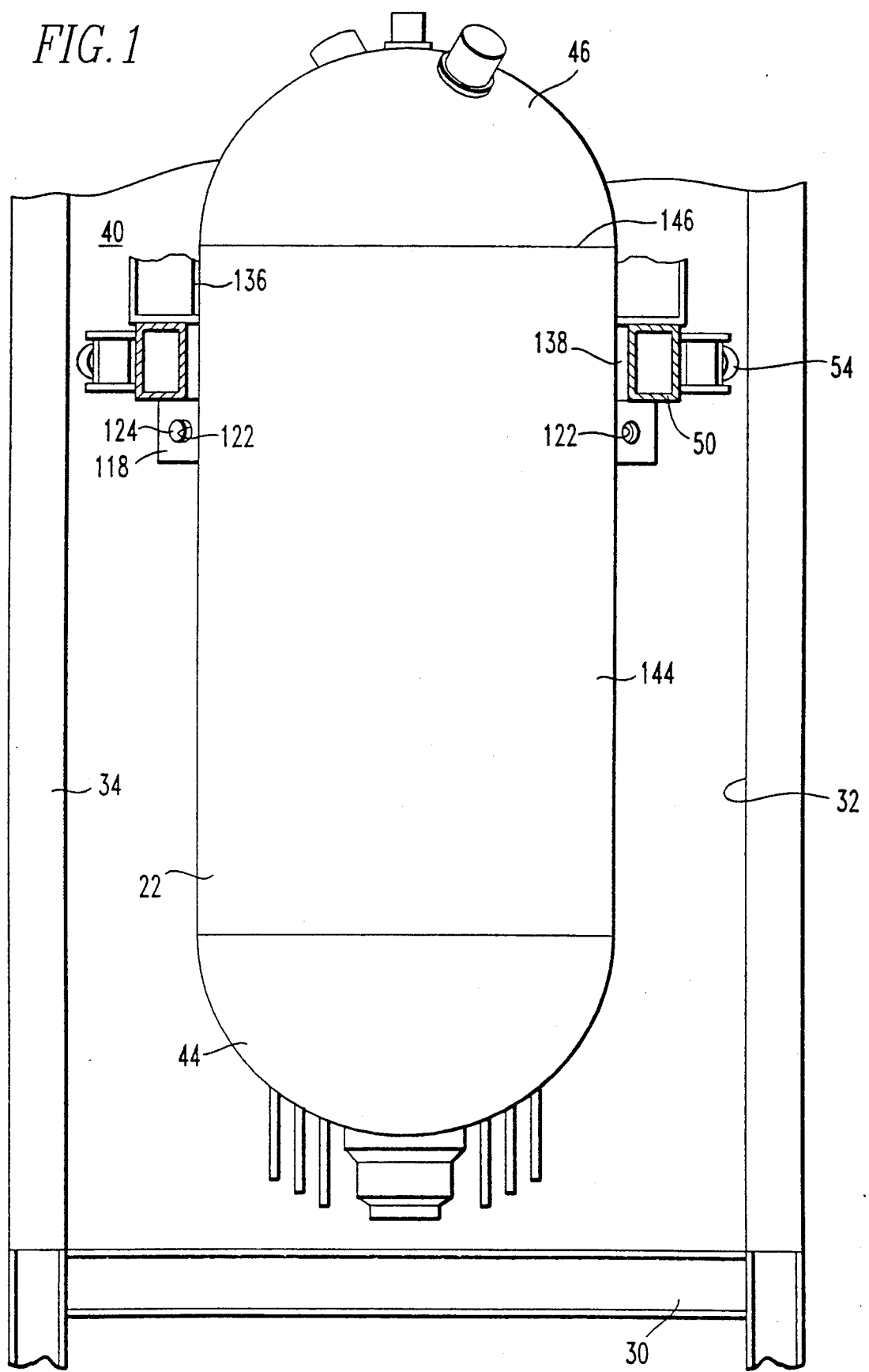
FIG. 1 is a side elevation view of a pressurizer tank in a compartment, with the compartment and mounting shown partly cut away.

A pressurizer tank 22 as shown in FIG. 1, is a vertically elongated tank supported on a substructure 30 in a reactor containment building. A compartment 32 is provided to substantially enclose the pressurizer tank 22, and the compartment 32 is shown in the drawings rather than the full containment building. The compartment 32 can be defined, for example, by interior concrete walls 34 in the containment.

Figure 2:
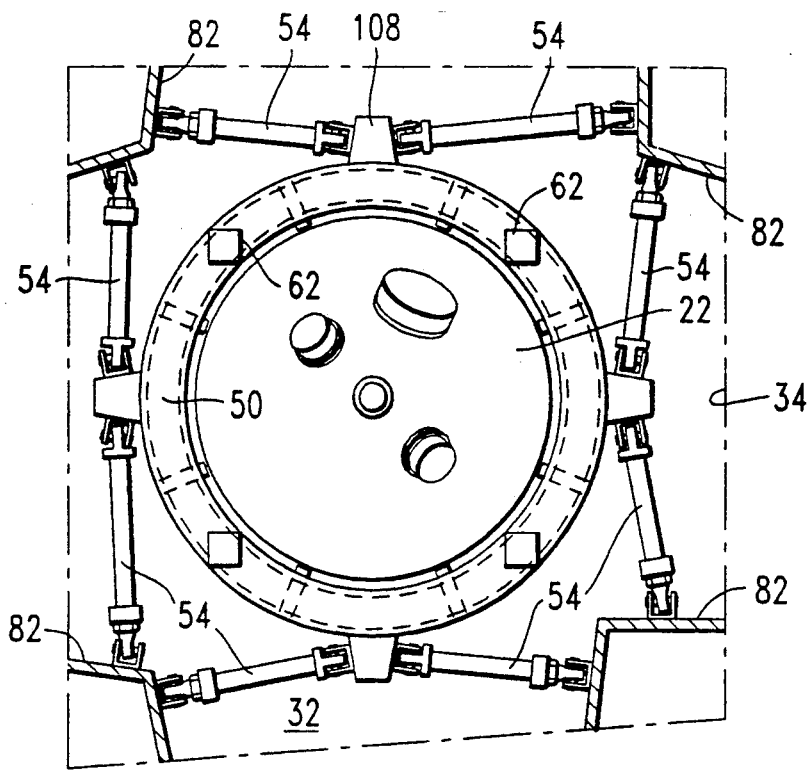
FIG. 2 is a top plan view of the pressurizer tank and compartment of FIG. 1, showing the lateral support structure.
Figure 5:
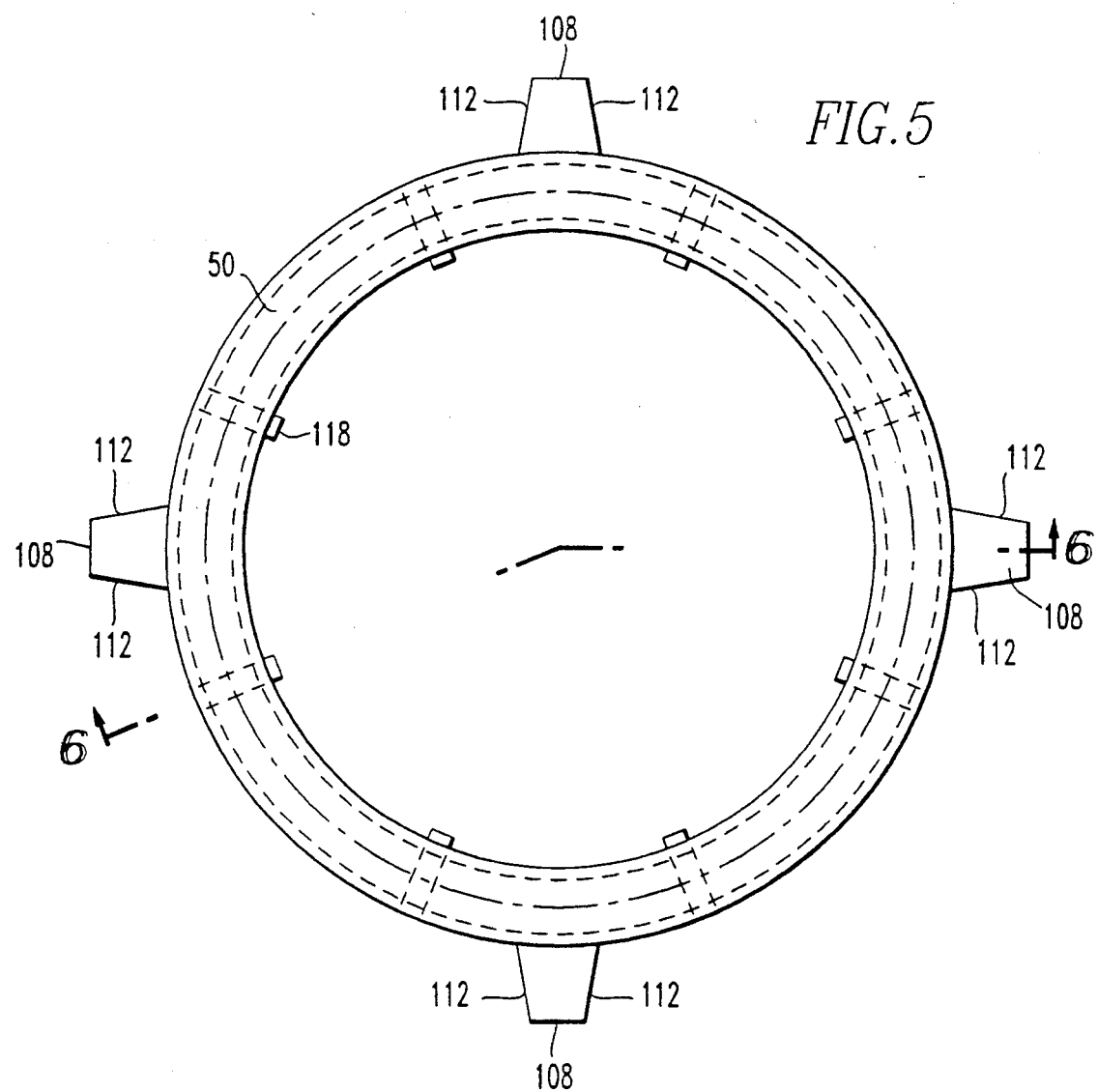
FIG. 5 is a top plan view of the support girder, apart from the pressurizer tank.
Figure 6:
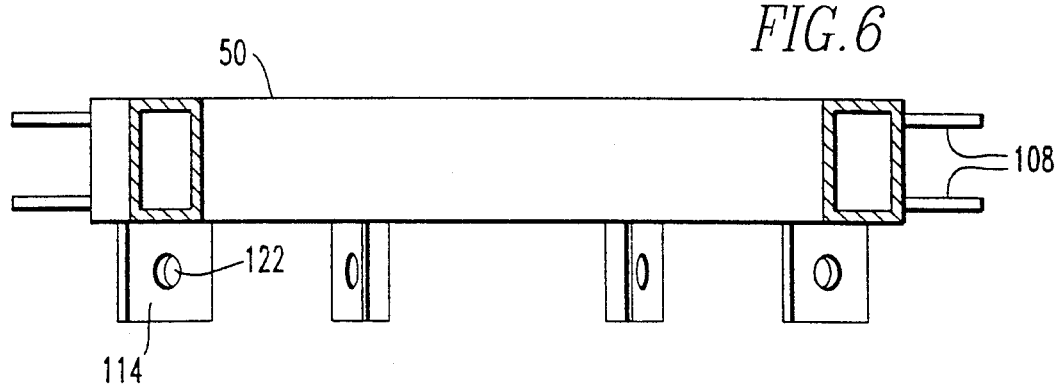
FIG. 6 is a section view taken along line 6—6 in FIG. 5.

As shown in FIGS. 2, 5 and 6, an upper support 40 for the pressurizer tank 22 is provided at a space from the bottom 44 of the tank 22, preferably adjacent the top 46 of the tank. The upper support 40 includes a circular box girder 50 surrounding the pressurizer tank 22, attached to the walls 34 of the compartment 32 by sway struts 54. The sway struts 54 couple any lateral forces on the girder 50 to the compartment walls 34, such that such lateral forces are not transmitted through the pressurizer tank 22 to the substructure 30 on which the pressurizer tank 22 is supported vertically.

Figure 3:
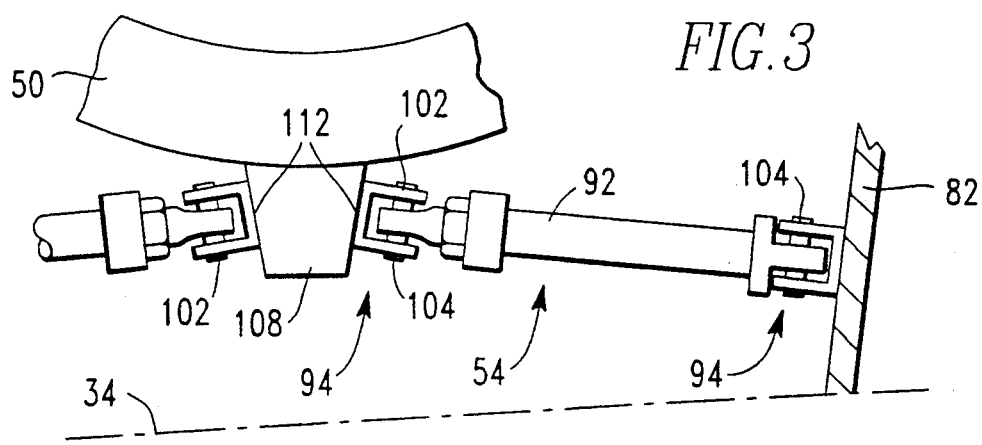
FIG. 3 is a detailed partial view corresponding to FIG. 2, showing one sway strut in plan view.
Figure 4:
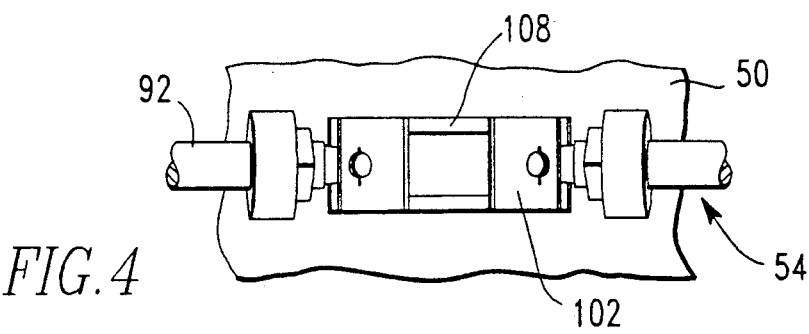
FIG. 4 is a partial elevation view corresponding to FIG. 4, showing the attachment of the sway struts and the pressurizer tank block plates.
Figure 7:
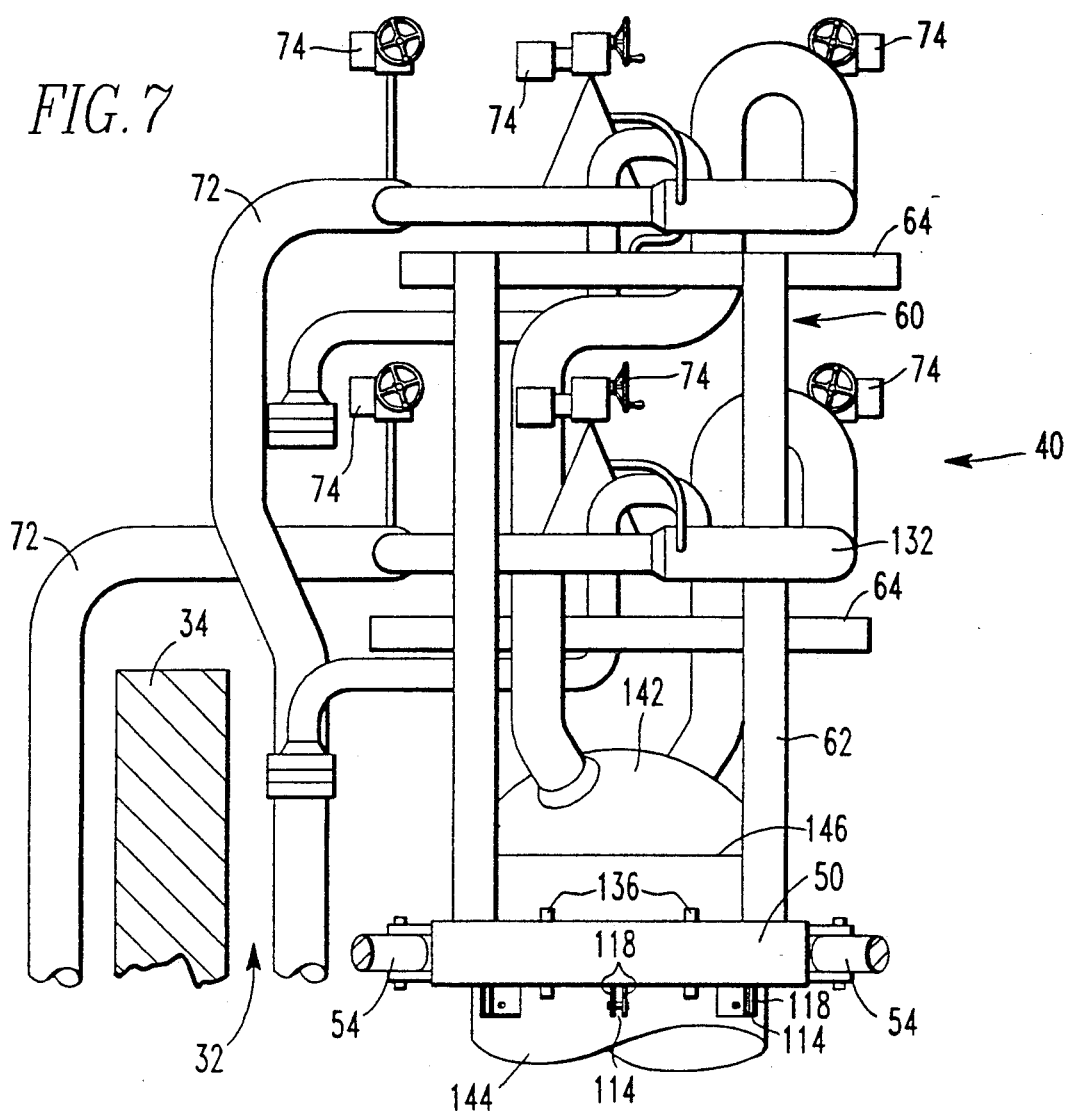
FIG. 7 is an elevation view showing the valve support frame and valve modules disposed over the pressurizer tank.
Figure 8:
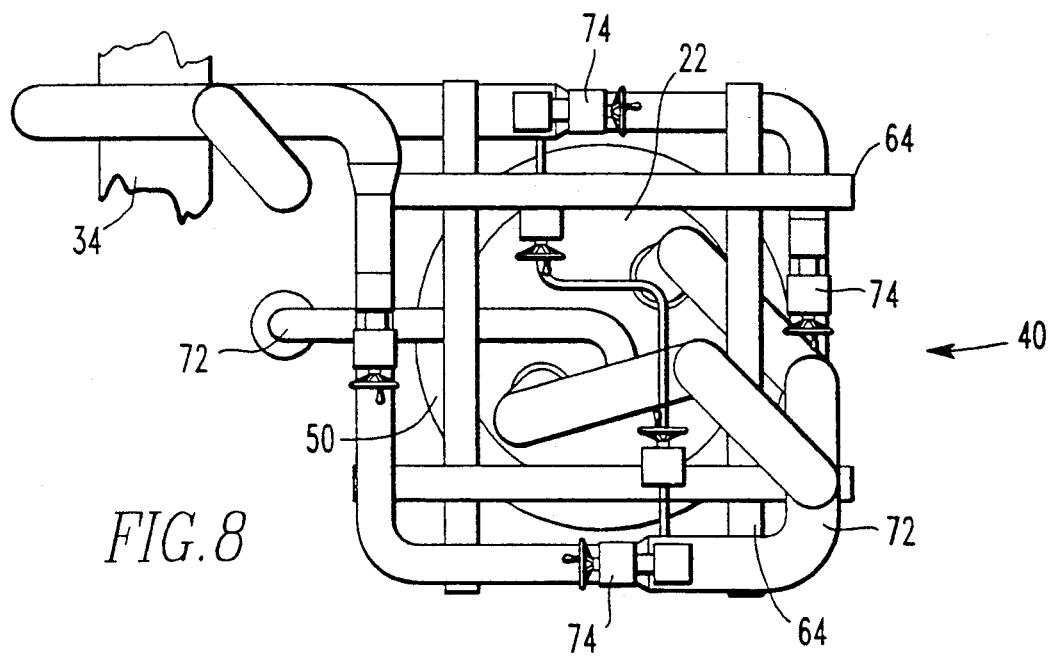
FIG. 8 is a top plan view corresponding to FIG. 7, showing the support frame and valve modules in top plan view.

The sway struts 54 are shown in detail in FIGS. 2-4, and the girder 50 in FIGS. 5 and 6. The girder 50 can rest vertically upon valve support bracket plates 118 protruding radially from the outer wall of the pressurizer tank 22, as shown in FIG. 7. The sway struts 54 define substantially inextensible coupling members which are attached between the pressurizer tank 22 and the compartment walls at tie points defining a horizontal pivot axis, as discussed more fully hereinafter.

The pressurizer tank 22 is susceptible to lateral forces due to the structures carried at the top and above the pressurizer tank. A relief/discharge valve support frame 60 is disposed over the pressurizer tank 22 for mounting such structures. The support frame 60 includes vertical legs 62 and horizontal beams 64, the legs and beams being welded together to form a structural frame. The legs 62 are rested on and welded at their lower ends to the upper surface of the box girder 50. The relief/discharge support frame 60 carries discharge piping 72 and valve module elements 74, through which the pressurizer tank 22 can be vented to an in-containment refueling water storage tank (not shown). The piping 72 and valve modules 74 define a weight which is spaced from the substructure 30 of the containment interior concrete which supports the pressurizer tank 22. It is not advantageous to attempt to support the piping 72 and valves 74 independently of the pressurizer tank 22, because the piping 72 is coupled to the tank 22, and the tank is subject to dimensional variations due to changes in pressure and pressure in the reactor coolant system. Accordingly, it is necessary to ensure that the mounting of the pressurizer tank is sufficiently strong to hold the tank 22 and its supported appendages against lateral displacement in the event of a seismic shock or other lateral force.

The box girder 50 is restrained against lateral displacement relative to the compartment 32 by a plurality of opposed sway struts 54 extending from the girder 50 to the walls 34 of the structural compartment 32 in which the pressurizer tank 22 is located. In the example shown, the compartment 32 is approximately square in plan view and the sway struts 54 extend from the girder 50 between the corners 82 of the compartment 32 and a respective attachment to the girder 50 approximately midway between the corners 82, in opposed pairs. The sway struts 54 can be conventional supporting struts (such as Grinnell FIG. 211 or the like). Attachment at the corners 82 of the compartment 32 provides maximum stiffness and load bearing capacity.

Referring to FIGS. 2-4, the sway struts 54 comprise horizontal load bearing shafts 92 terminating in pivot fittings 94. The distal member of each pivot fitting 94 can be welded or similarly fixed to the girder 50 and to a member of the compartment 32 such as a vertical beam at a corner 82 as shown. The pivot fittings 94 comprise backplates 102 shaped substantially as U-brackets opening toward the shaft 92 of the respective sway strut 54. Connecting pins 104 extend through the backplates 102 and through an end of each sway strut shaft 92, the pins 104 each defining a horizontal pivot axis in the connection between the box girder 50 and the compartment wall 34.

At the box girder 50, two vertically spaced attachment plates 108 having side edges 112 aligned substantially parallel to the respective sway strut pivot axis are welded to the outer periphery of the box girder 50 and provide a point of attachment for the backplates 102 of the sway strut fittings 94. The sway strut shafts 92 can include self-aligning bushings such that each end of the shafts remains aligned with the pivot axis defined by the connecting pin 104 extending through the backplate 102.

FIGS. 5 and 6 show the box girder 50 in greater detail. The attachment plates 108 as shown can comprise two horizontal plates, spaced vertically and welded on the surface of the box girder 50. It is also possible to use a channel member or a solid block to define a point of attachment for the sway strut backplates 102. As also shown in FIG. 6, a plurality of coupling plates 114 are also welded or similarly attached to the girder 50. The coupling plates 114 protrude axially downwardly from girder 50 and are oriented along radii of the tank 22, for example at intervals of 45°. These coupling plates 114 are positioned and dimensioned to extend between pairs of complementary coupling plates 118 which are welded onto the outer surface of the pressurizer tank 22. This form of connection is shown in FIG. 7. The coupling plates 114, 118 attached respectively to the girder 50 and to the pressurizer tank 22 have alignable holes 122 for receiving locking pins 124, thereby engaging the box girder 50 with its attached supporting frame 60 vertically on the pressurizer tank 22.

Figure 9:
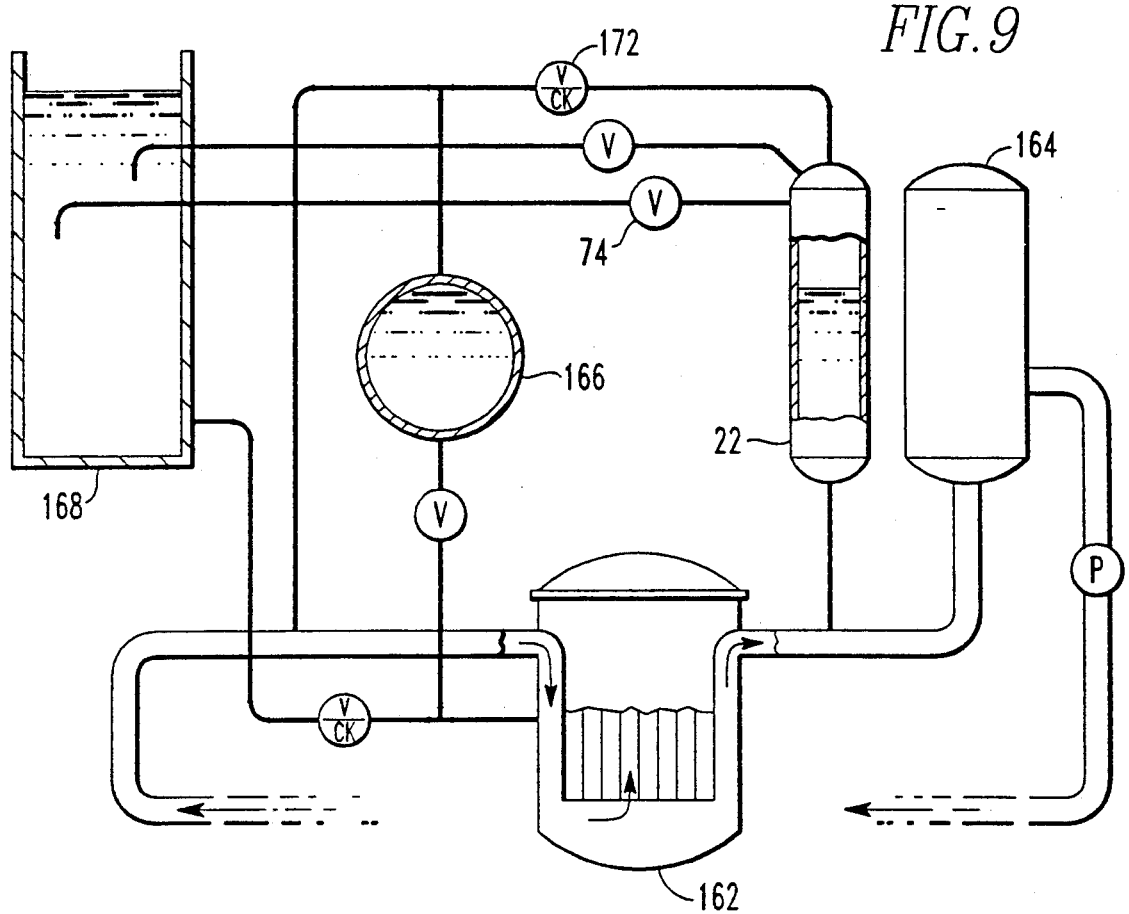
FIG. 9 is a simplified schematic view illustrating the coupling of a pressurizer in a reactor circuit having passive cooling.

The support frame carrying 60 the relief/discharge valve and conduit system is welded at the top of the box girder 50 encircling the pressurizer tank 22. As shown in FIG. 7, the relief/discharge valves 74 and conduits 72 can comprise a multi-tiered arrangement, for example enabling staged depressurization of the depressurizer tank 22 through conduits 72 of different diameters, each having one or more valves 74 which open a flow path to a discharge, for example, in an in-containment refueling water supply. FIG. 9 generally illustrates the flowpath couplings according to such an arrangement, with a nuclear reactor vessel 162 coupled in a coolant circuit with a steam generator 164, and also a high pressure makeup tank 166 and an atmospheric pressure refueling water supply tank 168. Pressurizer 22 controls the pressure of the coolant circuit through check valve 172, and also is coupled via depressurization valves 74 to discharge into the refueling water supply 168. The respective valves 74 can be operated successively to obtain staged depressurization.

At least a first level 132 of the relief/discharge support frame 60 is insulated in order to reduce thermal stresses due to differences in temperature between the relief/discharge support frame 60 and the piping 72 associated with the relief/discharge system. During automatic staged depressurization of the reactor coolant system, different valves 74 are opened in sequence, thereby subjecting selected subsets of the conduits 72 to thermal loading. The girder 50 is not insulated in order to preclude high thermal loading on the sway struts 54.

As mentioned above, the girder 50 is preferably attached to the tank 22 vertically via mating coupling plates 114, 118 attached respectively to the pressurizer tank 22 and the girder 50, held together by pins 124. Valve supporting brackets are welded on the pressurizer tank surface, and a bracket matching such a valve support bracket can be welded to the bottom of girder 50 to mate with the valve supporting brackets. Either a slot in the girder bracket 114 is custom machined at the correct location, or an oversized bracket 114 with a slot already provided is custom fit and welded in place to properly fit the pressurizer valve support bracket in that case. Of course, it is readily possible to use two brackets on either of the girder 50 and the pressurizer 22 to mate with one bracket on the other, or to attach single plates to each of the girder 50 and the tank 22, e.g., using bolts. It is desirable to leave a small gap between the girder brackets 114 and the valve brackets 118, which helps to prevent weak axis bending loads on the brackets 112, 114.

Strip shims 136 are located between the pressurizer outer surface and the girder 50 with an appropriate hot gap 138 (e.g., 1/32 inch or 0.8 mm). Strip shims 136 provide the necessary lateral load transfer between the girder 50 and the pressurizer tank 22 while minimizing the heat transfer path. Since the relief/discharge support frame 60 is welded to the girder 50 and the girder is fastened to the building structure by the sway struts 54, all relief/discharge system lateral loads are borne directly by the compartment walls 34 rather than passing wholly or partly through the pressurizer 22 and then to the compartment 32 or to the substructure 30.

The girder 50 can accommodate upward and downward displacement relative to the compartment walls 34 as the tank 22 enlarges and contracts during plant heatup and cooldown. The pivotal couplings of the sway struts 54, and their self aligning bushings, permit vertical pivoting of the sway struts 54 around their connecting pins 104, which allows some vertical displacement of the girder 50 (and tank 22) relative to the compartment walls 34. Insofar as the girder 50 moves up or down, the sway bars 54 still can accommodate the relative displacement while bearing any lateral forces which may occur.

The sway struts 54 as shown are arranged in pairs aligned substantially along tangents to the wall of tank 22, which is cylindrical. Although four pairs of sway struts 54 are preferred at 90° intervals, it would be possible to use a larger or smaller number to restrain the pressurizer tank 22 and the upper support 40 thereon. For example, a 120° arrangement using three pairs of struts 54 could be employed to obtain a triangular configuration in which the struts 54 would still be substantially tangential to the girder 50 and arranged in opposed sets to bear lateral loading in any direction.

The pressurizer tank 22 has a top dome 142, attached to a tubular body 144 at a weld 146. Preferably the girder 50 is disposed below the weld 146 in order to facilitate inspection of the weld, e.g. about 9 inches (23 cm) below the weld 146.

Figure 10:
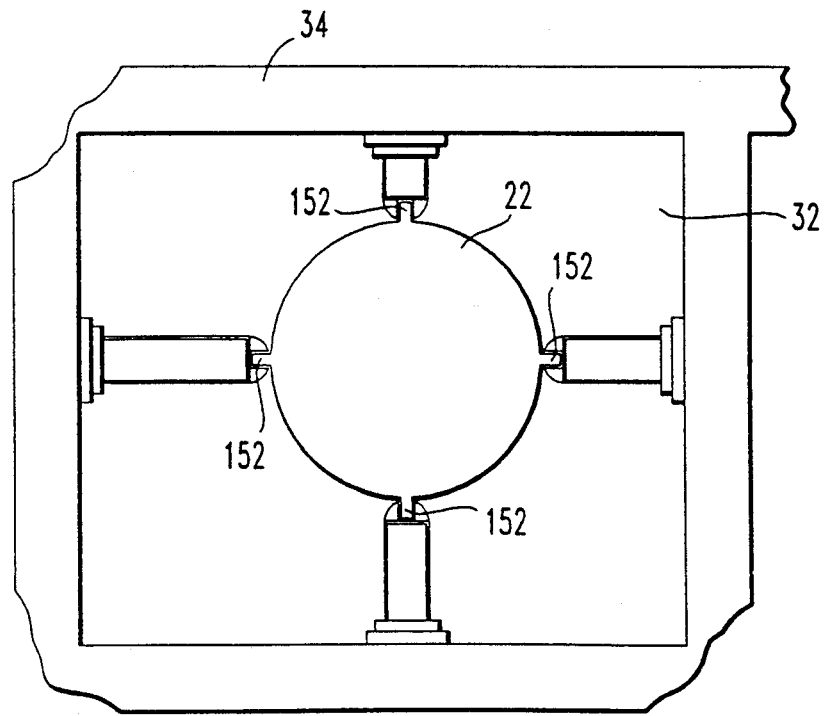
FIG. 10 is a top plan view of a conventional upper support for a pressurizer tank.

The support according to the invention provides an improved restraint for the pressurizer tank 22, and eliminates the need for seismic lugs, for example of the type shown by lugs 152 in FIG. 10 and identified as prior art. All lateral forces according to the invention are coupled to the compartment walls 34, preferably at the corners 82, for maximum stiffness and load bearing capacity.

The invention having been disclosed, certain variations within the scope of the inventive concept will now be apparent to persons skilled in the art. The invention is intended to encompass a reasonable range of equivalents, and accordingly, reference should be made to the appended claims rather than the foregoing specification in order to assess the scope of exclusive rights in the invention claimed.

We claim:

1. A support for a pressurizer tank of a nuclear reactor, the pressurizer tank being mounted between structural walls of a reactor building and resting on a substructure of the reactor building, the tank having a vertically elongated tank wall extending upwardly from the substructure, the support comprising:
   a girder substantial encircling the pressurizer tank at a space above the substructure;
   a plurality of sway struts, each attached at one end to the girder and at an opposite end to one of the structural walls, the sway struts being oriented substantially horizontally in paris for coupling lateral loads on the pressurizer tank to the structural walls, the sway struts being attached at substantially horizontal pivot axes, whereby said girder is free to move vertically relative to the structural walls for accommodating dimensional variation of the pressurizer tank with changes in temperature and pressure in the reactor; and, a structural frame attached to the girder and extending upwardly relative to the pressurizer tank, the structural frame being arranged to carry at least one valve and conduit arrangement coupled to the pressurizer tank.

2. The support according to claim 1, wherein the pressurizer tank has a top dome welded to a tubular body at a weld, and wherein the girder is disposed at a space below the weld.

3. The support according to claim 1, wherein the valve and conduit arrangement comprises at least one relief/discharge conduit and valve operable to vent the pressurizer tank.

4. The support according to claim 3, wherein the valve and conduit arrangement comprises a plurality of valves operable to effect staged depressurization of a coolant system to which the pressurizer tank is coupled.

5. The support according to claim 4, wherein said valve and conduit arrangement comprises a multi-tiered arrangement attached at respective levels of the support frame, defining a weight spaced above the substructure.

6. The support according to claim 1, wherein the pressurizer tank is substantially cylindrical and the girder is circular, the sway struts being arranged in pairs aligned substantially along tangents to a wall of the tank.

7. The support according to claim 6, comprising eight sway struts attached to the girder at 90° intervals around the girder.

8. The support according to claim 1, wherein the structural walls of the reactor building include a compartment substantially enclosing the pressurizer tank, the compartment having corners and the sway struts extending substantially horizontally between the girder and the corners of the compartment.

9. The support according to claim 4, wherein the pressurizer tank is substantially cylindrical and the girder is circular, the sway struts being arranged in pairs aligned substantially along tangents to the girder and the tank.

10. The support according to claim 9, comprising eight sway struts attached to the girder at 90° intervals around the girder.

11. The support according to claim 1, further comprising thermal insulation blocking heat transfer to at least part of the structural frame, whereby loading of the valve and conduit arrangement is minimized.

12. The support according to claim 11, wherein a gap is defined between an inner side of the girder and an outer side of the pressurizer tank, and further comprising at least one shim disposed between the pressurizer tank and the girder, the shim laterally fixing the girder relative to the pressurizer tank for supporting lateral loads while reducing thermal transfer.

13. The support according to claim 1, wherein the girder is vertically attached to the pressurizer tank by connecting pins.

14. The support according to claim 13, comprising a plurality of coupling plates attached respectively to the girder and to an outer surface of the pressurizer tank, the coupling plates attached to the girder and to the outer surface being fixed vertically by locking pins.

* * * * *